US011298989B2

(12) United States Patent
Engl et al.

(10) Patent No.: US 11,298,989 B2
(45) Date of Patent: *Apr. 12, 2022

(54) TPMS AUTOLOCALIZATION USING DIRECTION SENSITIVE ANTENNAS

(71) Applicant: Infineon Technologies AG, Neubiberg (DE)

(72) Inventors: Thomas Engl, Munich (DE); Michael Kandler, Sauerlach (DE); Maximilian Werner, Fischach (DE)

(73) Assignee: Infineon Technologies AG

( * ) Notice: Subject to any disclaimer, the term of this patent is extended or adjusted under 35 U.S.C. 154(b) by 40 days.

This patent is subject to a terminal disclaimer.

(21) Appl. No.: 16/907,784

(22) Filed: Jun. 22, 2020

(65) Prior Publication Data

US 2021/0046789 A1    Feb. 18, 2021

Related U.S. Application Data

(63) Continuation of application No. 16/538,110, filed on Aug. 12, 2019, now Pat. No. 10,737,541.

(51) Int. Cl.
*B60C 23/04*  (2006.01)

(52) U.S. Cl.
CPC ...... *B60C 23/0416* (2013.01); *B60C 23/0444* (2013.01); *B60C 23/0452* (2013.01); *B60C 23/0471* (2013.01)

(58) Field of Classification Search
CPC ............. B60C 23/009; B60C 23/0416; B60C 23/0437; B60C 23/0444; B60C 23/0452; B60C 23/0471; B60C 23/0483
See application file for complete search history.

(56) References Cited

U.S. PATENT DOCUMENTS

| | | | | |
|---|---|---|---|---|
| 2006/0290484 A1* | 12/2006 | Bauchot | .............. | B60C 23/0416 340/442 |
| 2008/0100429 A1* | 5/2008 | Luo | .................... | B60C 23/0444 340/447 |
| 2011/0304449 A1* | 12/2011 | Lickfelt | .............. | B60C 23/0452 340/442 |
| 2012/0236951 A1* | 9/2012 | Kosugi | ................. | H04L 1/0061 375/259 |
| 2017/0174013 A1* | 6/2017 | Fenkanyn | ........... | B60C 23/0415 |
| 2018/0111429 A1* | 4/2018 | Matsuoka | ........... | B60C 23/0416 |
| 2019/0230615 A1* | 7/2019 | Werner | ............... | B60C 23/0422 |

* cited by examiner

*Primary Examiner* — Sisay Yacob
(74) *Attorney, Agent, or Firm* — Design IP

(57) ABSTRACT

A method of localizing a TPMS sensor module includes transmitting, by the TPMS sensor module, a TPMS signal; and localizing, by a localization module, the TPMS sensor module based on receiving the TPMS signal at a phase array antenna including a plurality of reception antennas each configured to receive the TPMS signal. Localizing the TPMS sensor module includes measuring a phase of the TPMS signal at each of the plurality of reception antennas such that a plurality of phases corresponding to the TPMS signal are determined, and determining a location of the TPMS sensor module based on the plurality of phases.

24 Claims, 5 Drawing Sheets

TPMS AUTOLOCALIZATION USING DIRECTION SENSITIVE ANTENNAS

CROSS-REFERENCE TO RELATED APPLICATIONS

This application is a continuation of U.S. patent application Ser. No. 16/538,110 filed Aug. 12, 2019, which is incorporated by reference as if fully set forth.

FIELD

The present disclosure relates generally to a tire pressure monitoring system (TPMS) and, more particularly, to localizing TPMS sensor modules in a TPMS.

BACKGROUND

Tire Pressure Monitoring Systems (TPMS) play an important role in vehicle safety and emissions reduction. A majority of this market is served by direct tire pressure monitoring systems, in which each tire contains a TPMS sensor module. Thus, a battery powered sensor module is assembled in the inside of a tire to monitor a tire pressure thereof. The sensor module contains a pressure sensor, a microcontroller, a radio-frequency (RF) transmitter, and a coin battery cell.

Principally, the sensor module measures the tire pressure and uses a unidirectional link to transmit the measurement data to a central unit in the vehicle. Since battery cannot be changed, sensor module lifetime is determined by battery lifetime. A major portion of the power consumption is generated by the RF transmission. Hence, it is an important task to reduce power consumption for RF transmission as much as possible.

The sensor module may also have a low-frequency (LF) receiver, which is used to configure the sensor module after mounting sensor module to the tire in the vehicle production or in a repair garage (e.g., in case of replacement modules or firmware update for maintenance of sensor modules which are already in use). Typically, the downlink communication from the sensor module to the vehicle is implemented via the RF transmitter at 315 or 434 MHz, whereas the uplink communication to the sensor module is implemented via the LF receiver at 125 kHz. Thus, two communication devices with two communication channels are used for bidirectional communication between the vehicle and the sensor module.

In order to properly asses each tire, a vehicle must be able to localize each TPMS sensor module, meaning it must be able to know which sensor module is located at which tire position (e.g., front left, rear right, etc.). In former times, manual localization, e.g., programming a fix location into the sensor module, was used. Current technologies allow for automatic localization. However, some vehicles, such as trucks including tractor trailers, have multiple axles, axles without wheel speed sensors, twin tires, and multiple tires in close proximity to each other making it impossible to accurately localize each TPMS sensor module with existing methods. For example, RF Received Signal Strength Indication (RSSI) does not provide the accuracy to distinguish nearby axles or twin tires. In the presence of twin tires, g-sensors (e.g., used in 2g sensing) cannot distinguish between say the outer left tire and the inner right tire. In addition, Angular Position Sensing (APS) requires the presence of wheel speed sensors, which are typically not present on trailer tires. Additionally, the accuracy of APS may not be sufficient to distinguish nearby axles or twin tires. Thus, current localization techniques may not be sufficient for localizing TPMS sensor modules in such environments. Therefore, an improved TPMS capable of localizing each TPMS sensor module may be desirable.

SUMMARY

One or more embodiments provide a tire pressure monitoring system (TPMS), including a TPMS sensor module having a sensor identifier (ID) and a localization module configured to localize the TPMS sensor module. The TPMS sensor module includes a pressure sensor configured to measure an internal air pressure of a tire and generate tire pressure information, and a transmitter configured to transmit a TPMS signal that includes at least the sensor ID. The localization module is configured to localize the TPMS sensor module based on receiving the TPMS signal. The localization module includes a phase array antenna including a plurality of reception antennas each configured to receive the TPMS signal. The TPMS signal has a different phase at each of the plurality of reception antennas. The plurality of reception antennas include a reference reception antenna and at least one additional reception antenna. The localization module includes a localization circuit configured to measure a reference phase of the TPMS signal received at the reference reception antenna, measure a respective shifted phase of the TPMS signal received at each of the at least one additional reception antenna, determine a respective phase shift between the reference phase and each respective shifted phase, and determine a location of the TPMS sensor module based on each determined respective phase shift corresponding to the TPMS signal.

One or more embodiments provide a tire pressure monitoring system (TPMS), including a plurality of axle assemblies each coupled to a different pair of wheels to which a different tire is mounted; a plurality of TPMS sensor modules, wherein each of the plurality of TPMS sensor modules has a unique sensor identifier (ID), and each of the plurality of TPMS sensor modules is configured to measure an internal air pressure of a corresponding tire and transmit a corresponding TPMS signal that includes at least the unique sensor ID thereof; and a localization module configured to localize each of the plurality of TPMS sensor modules based on receiving the corresponding TPMS signal of each of the plurality of TPMS sensor modules. The localization module includes a phase array antenna including a plurality of reception antennas each configured to receive each corresponding TPMS signal, wherein each corresponding TPMS signal has a different phase at each of the plurality of reception antennas, and wherein the plurality of reception antennas include a reference reception antenna and at least one additional reception antenna. The localization module further includes a localization circuit configured to, for each corresponding TPMS signal, measure a reference phase of the corresponding TPMS signal received at the reference reception antenna, measure a respective shifted phase of the corresponding TPMS signal received at each of the at least one additional reception antenna, determine a respective phase shift between the reference phase and each respective shifted phase, and determine a location of a TPMS sensor module associated with the corresponding TPMS signal based on each determined respective phase shift corresponding to the first TPMS signal.

One or more embodiments provide a method of localizing at least one tire pressure monitoring system (TPMS) sensor module. The method includes transmitting, by a TPMS sensor module, a TPMS signal that includes at least a sensor identifier (ID) of the TPMS sensor module; and localizing, by a localization module, the TPMS sensor module based on receiving the TPMS signal at a phase array antenna including a plurality of reception antennas each configured to receive the TPMS signal, wherein the TPMS signal has a different phase at each of the plurality of reception antennas, and wherein the plurality of reception antennas include a reference reception antenna and at least one additional reception antenna. The localizing the TPMS sensor module includes measuring a reference phase of the TPMS signal received at the reference reception antenna, measuring a respective shifted phase of the TPMS signal received at each of the at least one additional reception antenna, determining a respective phase shift between the reference phase and each respective shifted phase, and determining a location of the TPMS sensor module based on each determined respective phase shift corresponding to the TPMS signal.

BRIEF DESCRIPTION OF THE DRAWINGS

Embodiments are described herein making reference to the appended drawings.

DETAILED DESCRIPTION

Figure 1:
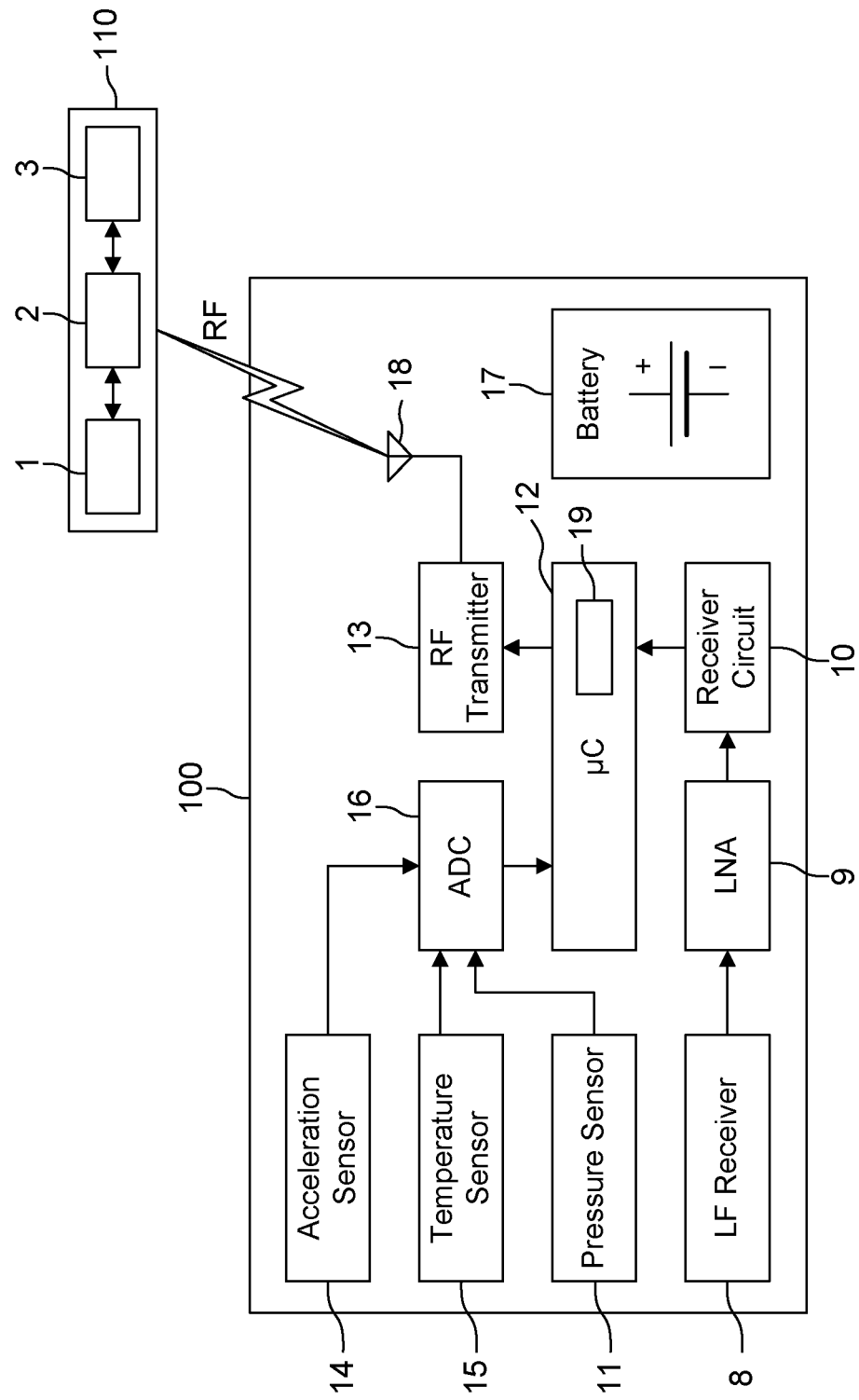
FIG. 1 illustrates a monolithic tire pressure monitoring system (TPMS) sensor module according to one or more embodiments.

In the following, a plurality of details is set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field (e.g., the Earth's magnetic field), an electric field, a pressure, an acceleration, a temperature, a force, a current, or a voltage, but is not limited thereto. A sensor device, as described herein, may be an angle sensor, a linear position sensor, a speed sensor, motion sensor, a pressure sensor, acceleration sensor, temperature sensor, a magnetic field sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

A sensor circuit may be referred to as a signal processing circuit and/or a signal conditioning circuit that receives the signal (i.e., sensor signal) from the pressure field sensor element in the form of raw measurement data. The sensor circuit may include an analog-to-digital converter (ADC) that converts the analog signal from the pressure sensor to a digital signal. The sensor circuit may also include a digital signal processor (DSP) that performs some processing on the digital signal (e.g., to prepare tire pressure information for transmission). Therefore, the sensor package comprises a circuit which conditions and amplifies the small signal of the pressure sensor via signal processing and/or conditioning.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

According to one or more embodiments, a pressure sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with other components to form a sensor module, sensor device, or the like.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

FIG. 1 illustrates a monolithic TPMS sensor module 100 according to one or more embodiments. The TPMS sensor module 100 is a direct TPMS sensor mounted inside a tire. The TPMS sensor module 100 includes a low-frequency (LF) receiver 8, a low-noise amplifier (LNA) 9, a receiver circuit 10, a pressure sensor 11, a microcontroller unit (MCU) 12, a radio frequency (RF) transmitter 13, an optional acceleration sensor 14, an optional temperature sensor 15, an ADC 16, a battery 17, and an antenna 18.

In particular, the acceleration sensor 14 may be a single axis or multi-axis accelerometer that is used for measuring the acceleration generated by car movement (e.g. for motion detection) and/or measuring the Earth's gravitational field. In the latter case, measuring the earth gravitational field results in a sine signal with 1g amplitude due to tire rotation. In other words, sinusoidal signal generated from the motion of the acceleration sensor moving through the Earth's gravitational field as it rotates about an axis (i.e., as the tire rotates about its axis). This sinusoidal signal is referred to as +/−1g signal.

This +/−1g signal can be used to calculate of the angular position of the TPMS sensor module with respect to the wheel axis. Furthermore, this angle information may be used to localize the wheel by comparing it to angle information from the wheel speed sensors.

If a two-axis accelerometer is mounted such that one sensitivity axis points in the wheel's radial direction and the second sensitivity axis in the wheel's tangential direction, the sinusoidal +/−1g signals from the two axes have a 90° phase shift with respect to each other. If the TPMS sensor modules are mounted the same way in all tires, and the tangential axis of an accelerometer located in a wheel on the left side of the vehicle points for instance in the driving direction, then the tangential axis of an accelerometer located in a wheel on the right side of the vehicle points opposite to driving direction. This results in a phase shift of 90° on the left side and a phase shift of −90° on the right side. Hence, the sign of the phase shift produced by each accelerometer allows a TMPS sensor module or ECU to detect whether the TMPS sensor module and the corresponding tire is mounted on the left side or the right side of the vehicle. This is called 2g direction sensing.

However, in the presence of twin tires, opposite phase shifts does not necessarily mean a mounting on opposite sides. This is because for twin tires, the inner and outer tire are mounted face-to-face, such that if the tangential accelerometer in the outer tire points into driving direction, the one in the inner tire points opposite to driving direction. Thus, an outer tire on one side of the vehicle (e.g., right side) may not be distinguishable form an inner tire on the other side (e.g. left side) of the vehicle.

The pressure sensor 11 can be incorporated as part of a typical semiconductor technology, and may be a microelectromechanical systems (MEMS) pressure sensor. Therefore, the pressure sensor 11 can enable the TPMS sensor 100, to aid in monitoring tire pressure. The pressure sensor 11, acceleration sensor 14, and the temperature sensor 15 each measure a corresponding physical quantity and provides analog sensor information in the form of electrical signals to the ADC 16, which converts the analog signals into digital signals before providing the MCU 12 with digital sensor information.

Thus, the pressure sensor 11 is electrically connected to the MCU 12 and configured to measure the internal air pressure of a tire. The TPMS sensor module 100 may also include the acceleration sensor 14 electrically connected to the MCU 12 and configured to detect and/or measure an acceleration of the tire (e.g., for detecting a motion of a vehicle or to generate a +−1g signal used for sensing a rotation direction of the tire). The TPMS sensor module 100 may also include the temperature sensor 15 electrically connected to the MCU 12 and configured to detect and/or measure an internal temperature of the tire, which may be used for compensating one or more pressure sensor measurements. For example, a measured temperature may be used for correcting the temperature dependency of slope and offset of the sensor signal.

A power supply 17 (e.g., a battery cell) is further provided to supply power to the TPMS sensor 100 and its components.

The MCU 12 receives tire pressure information in the form of measurement values from the pressure sensor 11, and processes the information. The MCU 12 may store the tire pressure information and/or prepare the tire pressure information for the RF transmitter 13. The MCU 12 may further receive acceleration information from the acceleration sensor 14 and temperature information from the temperature sensor 15. The RF transmitter 13 receives the collected data for transmission from the MCU 12.

The RF transmitter 13, coupled to the antenna 18, is configured to communicate with a vehicle electronic control unit (ECU) 110 or a transponder (not illustrated) via the antenna 18. For example, the RF transmitter 13 may be configured to transmit sensor data (e.g., pressure sensor data, acceleration sensor data, temperature sensor data, acceleration sensor data) or other feedback information, including feedback information derived from the sensor data (e.g., velocity/speed data, tire rotation period data, tire load data, etc.) to the ECU 110 or the transponder.

Thus, the RF transmitter 13 is electrically connected to the MCU 12 and is configured to transmit an RF signal that carries the sensor data and/or feedback information to the vehicle ECU 110 or transponder. The RF signal may be transmitted by the transmitter 13 autonomously or in response to the MCU 12 receiving data in the form of information, acknowledgement, or a command from the vehicle ECU 110 or transponder, where this data is received by the LF receiver 8.

Alternatively, the RF signal may be transmitted to a localization module (e.g., localization module 300 in FIG. 2), such as the aforementioned transponder. Moreover, the RF signal may be transmitted to a setting tool, a diagnostic and testing tool, or any other RF receiver. The localization module, for example, may be integrated in the body of the vehicle or integrated in the body of a trailer and may be configured to interface with each TPMS sensor module 100 for localization thereof and communication therewith. In some examples, the localization module may be the ECU 110 and in other examples the control module may be a transponder that is physically located between the TPMS sensor module and the ECU 110. In the latter case, the localization module may serve as an interface, relay, and/or intermediary between the TPMS sensor modules 100 and the ECU 110.

The ECU 110 or the localization module may include an RF receiver 1 for receiving sensor data and/or localization data, a processing unit 2 for processing the sensor data and/or localization data, and a memory unit 3 for storing processed sensor data or other information (e.g., tire information). It will be appreciated that while examples may refer to using RF signals for communication, other types of signals, such as Bluetooth low energy (BLE) signals, may be used instead. It will also be appreciated that the ECU 110 in this example may be substituted with the localization module (i.e., transponder) (e.g., localization module 300 in FIG. 2) or the localization module may be added and disposed between the sensor module 100 and ECU 110.

The ECU 110 may be configured to receive the sensor data and derive information from the sensor data (e.g., contact patch data, contact patch duration data, velocity/speed data, tire rotation data, tire load data) or may receive one or more of such information directly from the RF transmitter 13 (i.e., from the TPMS sensor module 100) or from the TPMS localization module.

In addition, the ECU 110 of the localization module may be configured to receive localization data and determine the wheel location for each TPMS sensor module 100, or the ECU 110 may receive the wheel location for each TPMS sensor module 100 from the localization module.

As mentioned above, the TPMS sensor module 100 may include an acceleration sensor 14 electrically connected to the MCU 12 and configured to detect and/or measure a centrifugal acceleration of the tire and/or a tangential acceleration of the tire, and generate acceleration sensor data. The acceleration sensor data may be used for detecting a motion of a vehicle, calculating a vehicle velocity or speed (m/s), calculating a tire rotation period (s or ms), calculating a tire wear of a tire, calculating a traveled distance (km), determining a rotation direction of the TPMS sensor module 100 corresponding to the rotation of the wheel, and ultimately determining on which side (e.g., left or right) of an axle the TPMS sensor module 100 is located.

As noted above, the acceleration sensor 14 may be an accelerometer integrated on a single chip and that has at least one sensitivity axis used for generating a +/−1g signal. The accelerometer may further include a second sensitivity axis that is used for generating another +/−1g signal. The MCU 12 may be configured to receive the two +/−1g signals, and determine a phase shift therebetween.

In turn, the MCU 12 may be configured to generate localization information of the TPMS sensor module 100 based on the phase shift and a localization algorithm (i.e., indicating vehicle side at which the TPMS sensor module 100 is located), or may transmit the phase shift information as localization information to the ECU 110 or the localization module (e.g., localization module 312 in FIG. 2), which then makes the vehicle side determination based on the phase shift information and the localization algorithm. In the end, the TPMS sensor module may be fully located (i.e. front left, front right, etc.) by the ECU 110 or the localization module.

The TPMS sensor module 100 also includes a receiver path that includes LF receiver 8, the LNA 9, and the receiver circuit 10. The receiver path may be used for receiving communication data from the ECU 110 or the localization module. Communication data may include, but is not limited to configuration information, programming information (e.g., for reflashing firmware code), or control information for the TPMS sensor module 100. The receiver circuit 10 may demodulate the received communication signal and provide the data to the MCU 12.

Specifically, the LNA 9 is configured to receive the electrical signal representative of the communication signal and amplify the signal without significantly degrading its signal-to-noise ratio. The amplified signal is then provided to the receiver circuit 10, which may perform additional signal processing on the signal prior to providing information to the MCU 12.

The MCU 12 further includes memory 19 that is configured to store information therein. Memory 19 may also be provided external to the MCU 12, and instead electrically coupled thereto. For example, memory 19 may be used to store tire information for each tire, such as at least one of tire type, tire dimensions (e.g., diameter), tire mileage, or tire wear. Tire information may be separately provided for each tire and may include a brand of tire, tire dimensions, tire materials, tire stiffness parameters, tire tread information, tire season information (e.g., winter or summer tire), and other tire characteristics. Memory 19 may also store numerical values that are representative of a mileage of a tire and/or wear of the tire. These numerical values may be calculated by the MCU 12, for example, from acceleration sensor data.

Alternatively, the ECU 110 may store one or more pieces of tire information, and, may calculate the numerical values that are representative of a mileage of a tire and/or wear of the tire, for example, from acceleration sensor data and the tire information, and may store the numerical values in memory at the ECU 110.

The MCU 12 includes at least one processing circuit (e.g., a signal processor) that receives sensor signals including various sensor data from the pressure sensor 11, the acceleration sensor 14, and the temperature sensor 15, and performs signal processing and/or conditioning thereon. For example, the at least one processing circuit may convert raw sensor measurements into sensor values (e.g., tire pressure values, acceleration values, and temperature values). In addition, the at least one processing circuit of the MCU 12 may calculate one or more of contact patch data, contact patch duration data, velocity/speed data, tire rotation data, tire wear data, and tire load data, as described herein.

The MCU 12 may also control one or more of the sensor devices via control signals. For example, the MCU 12 may prompt one or more sensor devices to make a measurement or may request information stored in memory 19.

In order for the MCU 12 to calculate the vehicle velocity v and the traveled distance, tire diameter information stored in memory 19 may be used along with the acceleration sensor data.

Alternatively, the MCU 12 may output sensor data to the RF transmitter 13 for transmission to the localization module or to the ECU 110.

Figure 2:
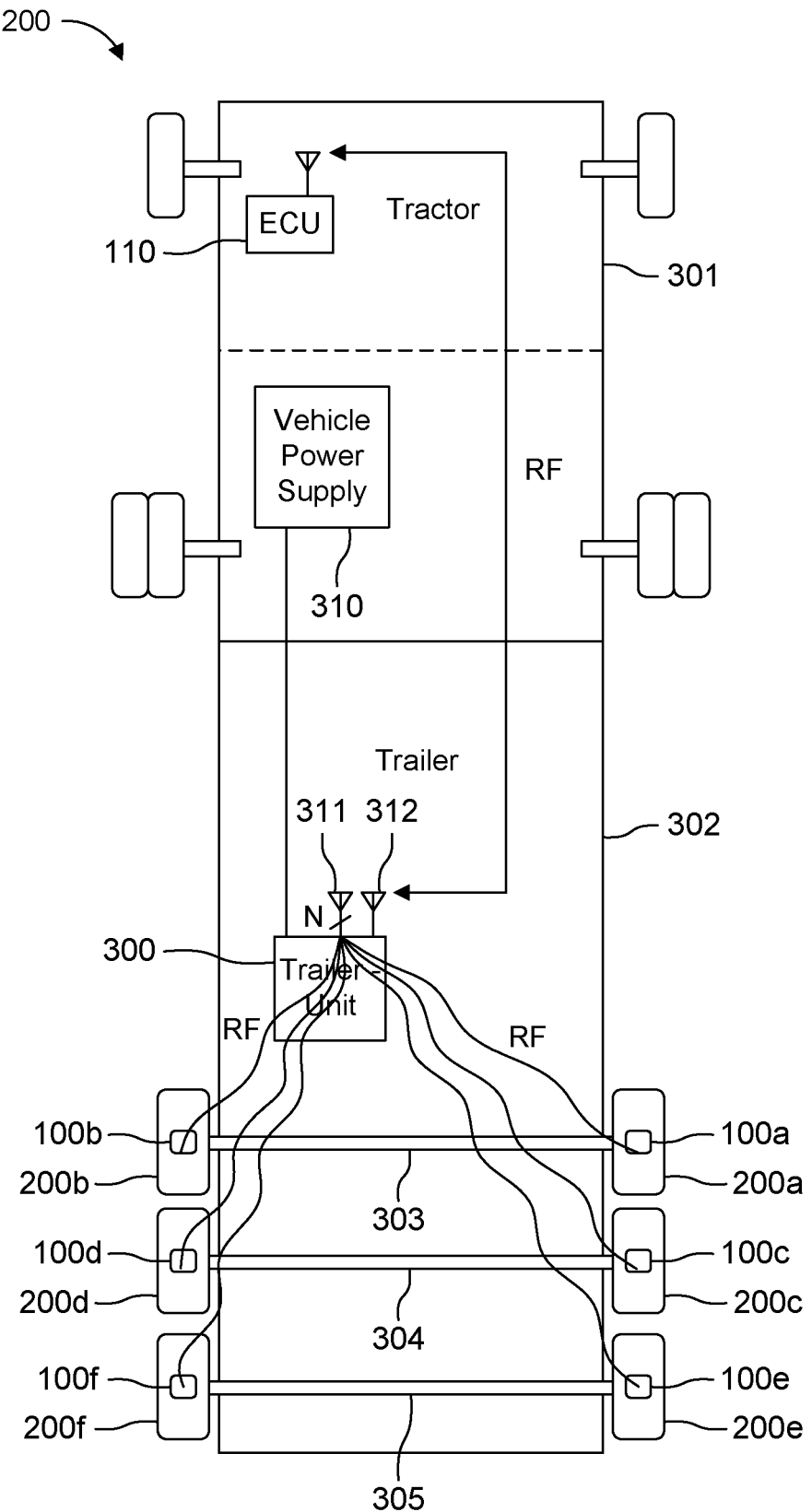
FIG. 2 is a schematic view of a sensor module localization system 200 for a vehicle according to one or more embodiments.

FIG. 2 is a schematic view of a sensor module localization system 200 for a vehicle according to one or more embodiments. In particular, FIG. 2 shows a bottom view of a tractor trailer that is configured a localization module 300. A tractor trailer includes a tractor 301 that makes up main vehicle compartment and a trailer 302 that attaches to the tractor 301 and typically has multiple rear axles. In this case, the trailer 302 has three rear axle assemblies 303, 304 and 305. Thus, multiple axle assemblies may be in proximity with each other such that two adjacent wheel assemblies 200 are spaced apart by no more than a tire diameter.

Each axle assembly 303-305 comprises an axle housing that is mechanically fixed to the trailer 302. Each axle housing houses and is mechanically coupled to a corresponding axle. The axle housings are rotationally fixed (i.e., they do not rotate). Each axle is configured to rotate within the housing and is mechanically coupled to two corresponding wheel assemblies 200, which rotate about the axis. Thus, the axle housings can be seen in FIG. 2, with each axle arranged in a corresponding axle housing.

The sensor module localization system 200 includes six wheel assemblies 200a-200e, collectively referred to as wheel assemblies 200. Furthermore, each wheel assembly 200 includes a TPMS sensor module 100. Thus, the sensor module localization system 200 includes six TPMS sensor modules 100a-100e, collectively referred to as TPMS sensor modules 100.

Each TPMS sensor module 100 is configured to transmit RF signals to a central receiver, such as the localization module 300. This central receiver can then use the information sent from each TPMS sensor module 100 for identifying the exact location of each TPMS sensor module 100.

In particular, the sensor module localization system 200 includes the localization module 300 that is electrically coupled to a vehicle power supply 310 of the tractor 301. The vehicle power supply 310 is a battery of the tractor 301 that supplies power to the localization module 300. The localization module 300 uses the power supplied by the vehicle power supply 310 receive and process received sensor module signals, generate localization data therefrom, and transmit the localization data to the ECU 110. The localization module 300 may also receive sensor data from the TPMS sensor modules 100, extract the sensor data from the received sensor module signals, and transmit the extracted sensor data to the ECU 110 either along the localization data or separately.

When transmitting localization data and/or sensor data to the ECU 110, the localization module 300 may transmit sensor module identifiers (IDs) associated with corresponding localization data and/or sensor data so that the ECU 110 can associate sensor module data with a respective sensor module 100.

The localization module 300 includes a phase array antenna 311 that includes multiple (N) individual antennas configured to receive RF signals from the TPMS sensor modules 100. The array of reception antennas is direction-sensitive antennas used by the localization module 300 to perform localization of the sensor modules 100. For example, the combination of at least two individual antennas plus the phase evaluation thereof (e.g., phase shift) achieves the direction sensitivity. The localization module 300 also includes a transmission antenna 312 configured to transmit RF signals, including localization data and/or sensor data, to the ECU 110.

The localization module 300 further includes an RF transceiver 313 including circuitry responsible for receiving and transmitting respective signals and a digital signal processing circuit 314 configured to determine a location (i.e., localize) of each of TPMS sensor module 100.

The localization module 300 is configured to transmit localization data to the vehicle's ECU 110 using the transmission antenna 312. In the case of transmitting the sensor data, the localization module may be seen as a relay for receiving and relaying the sensor data to the ECU 110. Sensor data includes tire pressure information, tire temperature, information, tire acceleration information, and/or information derived therefrom by the MCU 12.

The localization module 300 is configured to perform the localization via the phase array antenna 311 through sensing the spatial direction from which the sensor module signals (i.e., TPMS signals) are received. A TPMS signal may include a sensor ID of the corresponding sensor module or may include sensor data along with the sensor ID. Thus, as an example, a TPMS signal may carry a data message or packet that includes a sensor ID, pressure information, and temperature information.

An implementation of auto-localization with direction-sensitive antennas make use of the phase array antenna 311. As will be described in more detail, the TPMS signals received by each antenna of the phase array antenna 311 is mixed with a reference signal of similar frequency using an analog mixer in order to down-convert each TPMS signal into a baseband or an intermediate frequency band (IF band). Then, a low pass filter is employed on each down-converted signal in order to extract low frequencies components that can be sampled by an analog-to-digital converter (ADC).

In this way, for each TPMS signal, the phase shifts between the antennas originating from the differences in travel distance from respective TPMS sensor modules 100 can be obtained by a localization processor. In particular, the localization processor generates a phase shift profile for each TPMS signal, and determines the direction of the source of the RF signal (i.e., a direction of an incoming RF signal) based on the phase shift profiles. By linking this direction information of the received signal to the sensor ID received in the same received signal from a TPMS sensor module 100, the sensor positions can be identified and linked to each sensor ID (i.e., to each TPMS sensor module 100). The localization module 300 is further configured to transmit the localization data, including a sensor position, with the corresponding sensor ID to the ECU 110 for each TPMS sensor module 110.

Figure 3:
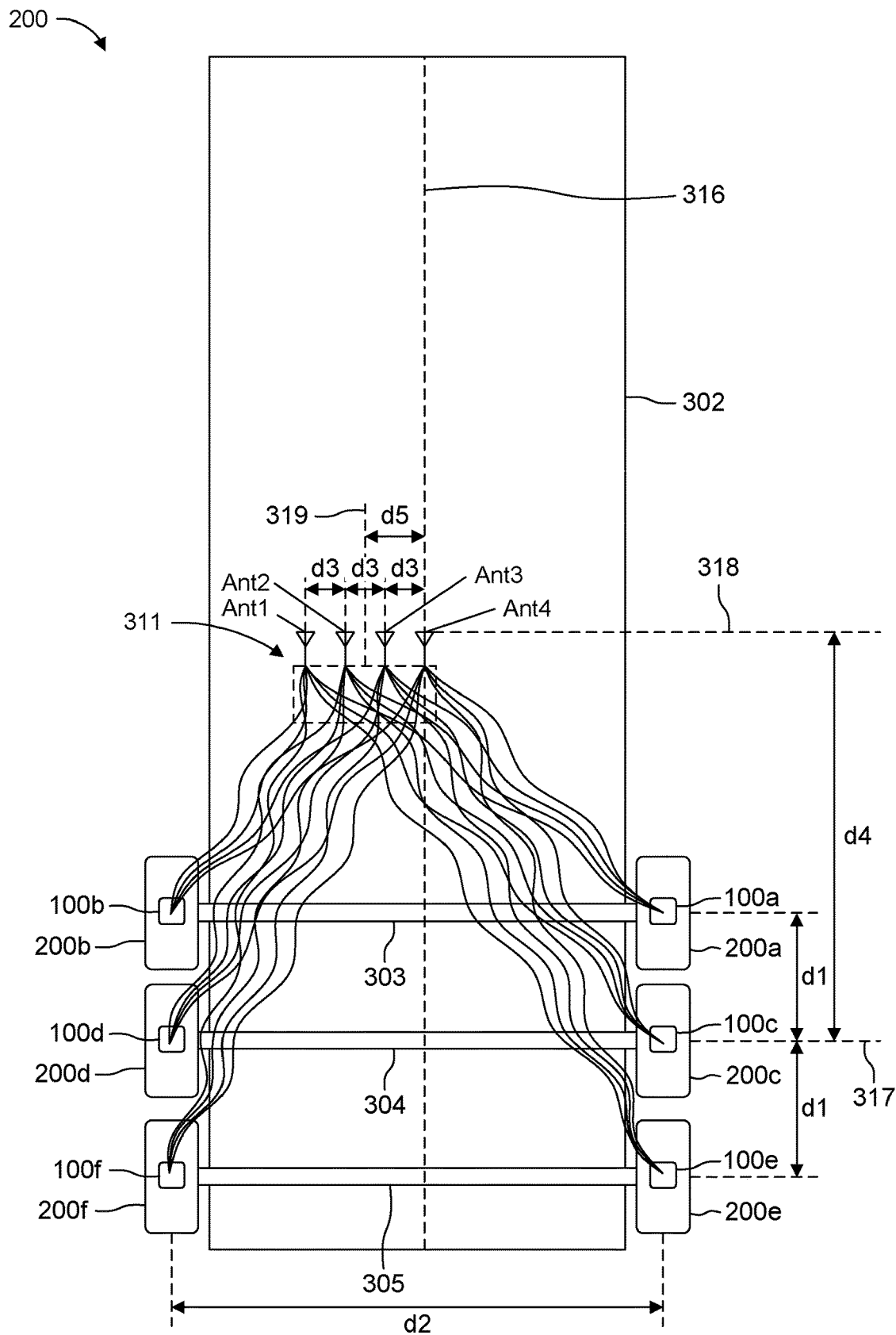
FIG. 3 illustrates a schematic view of the sensor module localization system shown in FIG. 2, with a phase array antenna deconstructed to show the individual antennas of the array.

FIG. 3 illustrates a schematic view of the sensor module localization system 200 shown in FIG. 2, with the phase array antenna 311 deconstructed to show the individual antennas Ant1, Ant2, Ant3, and Ant4 of the array. Additionally, a vertical axis of symmetry 316 and a horizontal axis of symmetry 317 are shown. The vertical axis of symmetry 316 represents a vertical symmetry center of the six tires 200, whereas the horizontal axis of symmetry 317 represents a horizontal symmetry center of the six tires 200. As can be seen, line 316 bisects each axle assembly 303-305 in an orthogonal manner, whereas line 317 is parallel to the axle assemblies 303-305. Some distances and offsets may be exaggerated and not drawn to scale in order to make the antenna arrangement more apparent.

In this example, a distance d1 between adjacent tires 200 on each side (measured center-to-center) is chosen to be of 1.2 meters, while the tires 200 on the left and right side are separated by a distance d2 set at 2.4 meters apart. Moreover, in this example, the antennas of the phase array antenna 311 arranged in a line parallel to the horizontal axis of symmetry 317 (i.e., parallel to the axle assemblies 303-305) and arranged asymmetrically to the tires 200. However, the antennas do not need to be placed in a line parallel to the horizontal axis but could form a line at a diagonal with respect to the horizontal axis. Alternatively, the arrangement of antennas may form any two dimensional geometrical shape. Depending on this shape, different placements may be possible. For example, the antennas may be arranged in the shape of a trapezoid.

In particular, the antennas Ant1, Ant2, Ant3, and Ant4 are equally spaced apart by a distance d3. The horizontal center of the phase array antenna 311 (i.e., a first symmetry center), represented by line 318, is shifted with respect to the horizontal axis of symmetry 317 by a distance d4 (e.g., 4.6 meters). The vertical center of the phase array antenna 311

(i.e., a second symmetry center), represented by line 319, is shifted with respect to the vertical axis of symmetry 316 by a distance d5 (e.g., 30 centimeters). While the antennas Ant1, Ant2, Ant3, and Ant4 are equally spaced apart by a distance d3 along line 318, the spacing may not be uniformly distributed. In some examples, the distance d3 between adjacent antennas may be 2-20 centimeters. Also, distance d4 is such that all tires 200 are on the same side of the horizontal center of the phase array antenna 311.

It is to be noted that the aforementioned distances should be treated merely as examples and is purely a choice of design as long as the vertical or horizontal center, which may also be referred to as a center of mass, of the phase array antenna 311 is not aligned along any symmetry axis defined by at least two tires (e.g., not along the symmetry lines 316 or 317) and spacing is sufficient to distinguish corresponding phase shifts of the TPMS signals. It will also be appreciated that the phase array antenna 311 is not limited to four antennas, but instead any number of antennas greater than one may be used as long as a variance in position for each TPMS sensor module can be detected. In some examples, two antennas may be sufficient, whereas in other examples more antennas may be used to improve accuracy. For example, the angle resolution for distinguishing the directions between two RF signals improves with more antennas.

As a result of the asymmetric arrangement of the antennas Ant1, Ant2, Ant3, and Ant4 with respect to the TPMS sensor modules 100, each TPMS sensor module 100 has a unique position with respect to each antenna. One of the antennas is used as a reference antenna from which a phase shift with respect to each of the other antennas is measured. Signals that travel different distances have different phases with respect to each other. Thus, difference in travel distance for each sensor module 100 to each antenna results in the TPMS signals for that sensor module having a different phase at each antenna.

A phase shift between the reference antenna (e.g., antenna Ant1) and each other antenna (e.g., antennas Ant2, Ant3, and Ant4) can be determined by the localization module 300. This results is a unique phase shift profile for each sensor module 100. The localization module 300 may correlate each phase shift profile to a direction of the source of the TPMS signal (i.e., a direction to the corresponding sensor module 100 at a corresponding wheel 200). Each direction may be further correlated by the localization module 300 to a wheel position.

For example, for TPMS sensor module 100a may transmit a TPMS signal that is received by antennas Ant1, Ant2, Ant3, and Ant4. The TPMS signal includes a sensor ID unique to the TPMS sensor module 100a and may include sensor data. The localization module 300 receives the TPMS signal at antennas Ant1, Ant2, Ant3, and Ant4, measures a first phase difference (i.e., a first phase shift) between reference antenna Ant 1 and antenna Ant2, measures a second phase difference (i.e., a second phase shift) between reference antenna Ant 1 and antenna Ant3, and measures a third phase difference (i.e., a third phase shift) between reference antenna Ant 1 and antenna Ant3.

The phase shifts are stored and compiled into a phase shift profile for TPMS sensor module 100a. From this phase shift profile, the localization module 300 is configured to determine the transmission direction of the TPMS signal from the TPMS sensor module 100a, and determine a wheel location of the TPMS sensor module 100a from the determined direction. The localization module 300 is configured to transmit the wheel location of the TPMS sensor module 100a along with its sensor ID, for example, with the two pieces of information linked in a data message or packet, to the ECU 110, which stores the received information.

Figure 4:
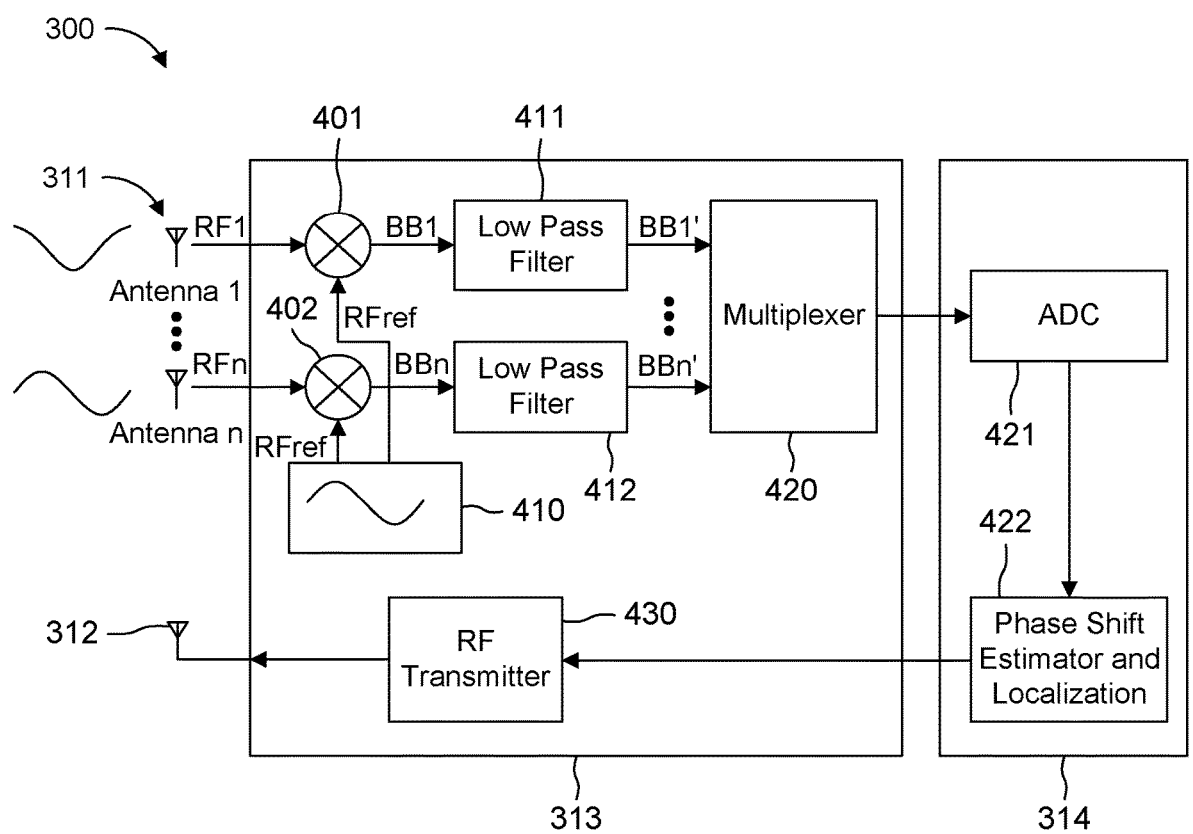
FIG. 4 is a schematic block diagram of the localization module 300 according to one or more embodiments.

FIG. 4 is a schematic block diagram of the localization module 300 according to one or more embodiments. The localization module 300 includes the phase array antenna 311, the transmission antenna 312, the RF transceiver 313 including circuitry responsible for receiving and transmitting respective RF signals, and the digital signal processing circuit 314 configured to determine a location (i.e., localize) of each of TPMS sensor module 100.

The phase array antenna 311 includes a reference reception antenna, in this case antenna 1, and at least one additional reception antenna n. Antennas 1 and n are configured to receive RF signals (i.e., a TPMS signal) from each TPMS sensor module 100. For the sake of brevity, it will be assumed that the RF signals shown in FIG. 4 originate from TPMS sensor module 100a but it will be appreciated that the same localization process is carried out for all sensor modules 100. As depicted, antennal 1 receives a signal RF1 and antenna n receives a signal RFn from TPMS sensor module 100a, where RF1 and RFn have different phases at each respective antenna.

The RF transceiver 313 includes a receiver circuit path for each reception antenna as well as a transmission circuit path for the transmission antenna 312. Each receiver circuit path includes a mixer (e.g., mixer 401 and 402) and a low pass filter (e.g., low pass filter 411 and 412). The RF transceiver 313 also includes a reference signal generator 410, such as a local oscillator, that generates a reference signal RFref, and an analog multiplexer 420. The frequency of the reference signal RFref has a small offset from the transmission frequency of the TPMS sensor modules 100 such that slowly varying signals are generated by the mixers.

Each receiver circuit path may also include a pre-amplifier (not illustrated) prior to the mixer for generating an amplified RF reception signal. The pre-amplifiers may be for example low-noise amplifiers (LNAs).

Mixer 401 receives signals RF1 and RFref such that signal RF1 is downmixed for example into baseband signal BB1 (or an IF band) and processed further in baseband by way of analog signal processing. The mixing may be performed in one stage (that is to say from the RF band directly into baseband) or over one or more intermediate stages (that is to say from the RF band into an intermediate frequency band and further into baseband). In this case, the reception mixer 401 effectively comprises a plurality of individual mixer stages connected in series.

Similarly, mixer 402 receives signals RF2 and RFref such that signal RF2 is downmixed for example into a baseband signal BBn (or an IF band) and processed further in baseband by way of analog signal processing. The mixing may be performed in one stage (that is to say from the RF band directly into baseband) or over one or more intermediate stages (that is to say from the RF band into an intermediate frequency band and further into baseband). In this case, the reception mixer 402 effectively comprises a plurality of individual mixer stages connected in series.

The analog signal processing essentially comprises filtering and possibly amplifying of the baseband signals BB1 and BBn. The low pass filters 411 and 412 perform filtering in order to suppress undesired sidebands and mirror frequencies. Alternatively, pass band filters may be used.

The processed baseband signals BB1' and BBn' are sent to the multiplexer 420 configured to receive the processed baseband signals from the low pass filters and selectively output each processed baseband signal to the digital signal processing circuit 314 for digital signal processing and localization analysis and determination. The multiplexer 420 may be configured to selectively output processed baseband signals based on a sensor ID such that signals corresponding to the same sensor ID but to different reception antennas are output sequentially to the digital signal processing circuit 314 for phase shift analysis.

Specifically, the digital signal processing circuit 314 includes an analog-to-digital converter (ADC) 421 that is configured to receive the multiplexed signals from the multiplexer 420, where the processed baseband signals are digitized in the digital domain and sent to processor 422. Thus, the digital signal processing chain may be implemented at least partly in the form of software that is able to be executed on the processor 422, for example, a microcontroller, a digital signal processor, or another computer unit. The processor 422 is configured to extract the sensor ID of each signal and determine a phase shift for each additional reception antenna with respect to the reference antenna, generate a phase shift profile for the TPMS sensor module 100a corresponding to its sensor ID, determine a direction of the sensor module 100a based on transmission/reception direction of the TPMS signals corresponding thereto, and determine a location of the TPMS sensor module 100a based on the determined transmission/reception direction.

Upon determining the location of the TPMS sensor module 100a, the processor 422 sends the localization information, including the location of the TPMS sensor module 100a, and the corresponding sensor ID to the RF transmitter 430 of the RF transceiver 313. The processor 422 may also provide sensor data, if applicable, to the RF transmitter 430. The RF transmitter 430 is configured to generate a data message including the localization information, the corresponding sensor ID, and possibly the sensor data, and transmit the data message to the ECU 110.

It will be appreciated that a similar localization processes is carried out for each TPMS sensor module 100, and that the RF transmitter 430 may report the location of each TPMS sensor module 100 to the ECU 110 separately or in the same data message (i.e., same RF signal).

Figure 5:
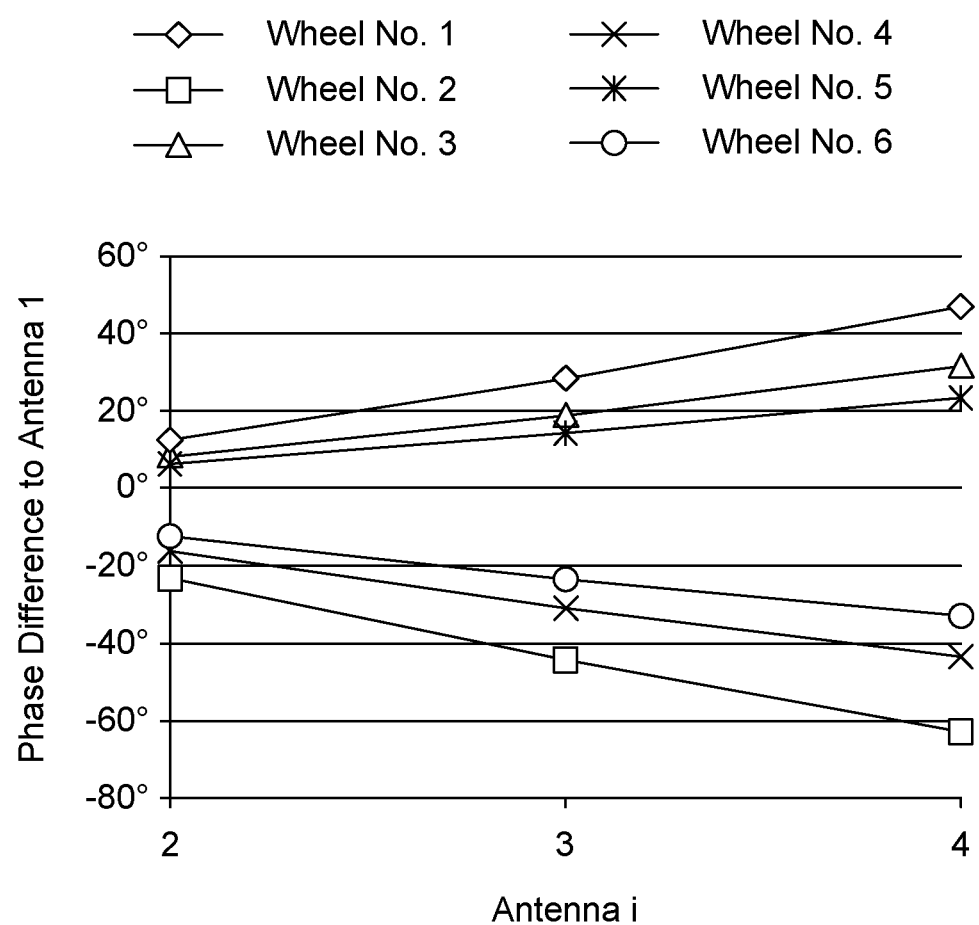
FIG. 5 illustrates a phase shift profile for a plurality of TMPS sensor modules according to one or more embodiments.

FIG. 5 illustrates a phase shift profile for a plurality of TMPS sensor modules according to one or more embodiments. Specially, the phase shift profile is based on the system described in reference to FIGS. 2 and 3, where distance d3 between neighboring antennas is 20 cm. As can be seen, each TPMS sensor module 100 results in a different phase shift profile distinguishable from the others. Thus, the processor 422 of the localization module 300 is capable of localizing each TPMS sensor module based on each unique phase shift profile.

While various embodiments have been described, it will be apparent to those of ordinary skill in the art that many more embodiments and implementations are possible within the scope of the disclosure. For example, while embodiments may be directed to tractor trailers, it will be appreciated that the sensor module localization system described herein may be applied to other types of vehicles.

Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods, and vice versa where a function or sting of functions described in context of implemented one or more devices may be performed as a method.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor", "processing circuitry", or the like may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A tire pressure monitoring system (TPMS), comprising:
a first TPMS sensor module having a first sensor identifier (ID), wherein the first TPMS sensor module comprises:
a first pressure sensor configured to measure an internal air pressure of a first tire and generate first tire pressure information; and
a first transmitter configured to transmit a first TPMS signal that includes at least the first sensor ID; and
a localization module configured to localize the first TPMS sensor module based on receiving the first TPMS signal, wherein the localization module comprises:
a phase array antenna comprising a plurality of reception antennas each configured to receive the first TPMS signal; and
a localization circuit configured to measure a phase of the first TPMS signal at each of the plurality of reception antennas such that a first plurality of phases corresponding to the first TPMS signal are determined, and determine a location of the first TPMS sensor module based on the first plurality of phases.

2. The TPMS of claim 1, wherein the localization circuit is configured to generate first localization information representative of the location of the first TPMS sensor module, and the localization module further comprises:
a transmitter configured to transmit a first message that includes the first localization information and the first sensor ID linked to the first localization information.

3. The TPMS of claim 2, further comprising:
a vehicle controller configured to receive the first message from the localization module and store the location of the first TPMS sensor module.

4. The TPMS of claim 1, wherein the localization circuit is configured to determine a direction of the first TPMS sensor module with respect to the phase array antenna based on the first plurality of phases, and determine the location of the first TPMS sensor module based on the determined direction.

5. The TPMS of claim 1, wherein:
each of the first plurality of phases are different,
the plurality of reception antennas include a reference reception antenna and at least one additional reception antenna, and
the localization circuit is configured to measure a first reference phase of the first TPMS signal received at the reference reception antenna, measure a first respective shifted phase of the first TPMS signal received at each of the at least one additional reception antenna, determine a first respective phase shift between the first reference phase and each first respective shifted phase, and determine the location of the first TPMS sensor module based on each determined first respective phase shift corresponding to the first TPMS signal.

6. The TPMS of claim 5, wherein:
the at least one additional reception antenna includes at least two additional reception antennas, and
the localization circuit is configured to measure the first respective shifted phase of the first TPMS signal received at each of the at least two additional reception antennas, generate a first phase shift profile corresponding to the first TPMS sensor module based on each first respective phase shift, and determine the location of the first TPMS sensor module based on the generated first phase shift profile.

7. The TPMS of claim 6, wherein the localization circuit is configured to determine a direction of the first TPMS sensor module with respect to the phase array antenna based on the first phase shift profile, and determine the location of the first TPMS sensor module based on the determined direction.

8. The TPMS of claim 1, further comprising:
a second TPMS sensor module having a second sensor identifier (ID), wherein the second TPMS sensor module comprises:
a second pressure sensor configured to measure an internal air pressure of a second tire and generate second tire pressure information; and
a second transmitter configured to transmit a second TPMS signal that includes at least the second sensor ID,
wherein the localization module is configured to localize the second TPMS sensor module based on receiving the second TPMS signal,
wherein each of the plurality of reception antennas is configured to receive the second TPMS signal, and
wherein the localization circuit is configured to measure phase of the second TPMS signal at each of the plurality of reception antennas such that a second plurality of phases corresponding to the second TPMS signal are determined, and determine a location of the second TPMS sensor module based on the second plurality of phases.

9. The TPMS of claim 8, wherein:
each of the second plurality of phases are different,
the plurality of reception antennas include a reference reception antenna and at least one additional reception antenna, and
the localization circuit is configured to measure a reference phase of the second TPMS signal received at the reference reception antenna, measure a respective shifted phase of the second TPMS signal received at each of the at least one additional reception antenna, determine a respective phase shift between the reference phase and each respective shifted phase, and determine the location of the second TPMS sensor module based on each determined respective phase shift corresponding to the second TPMS signal.

10. The TPMS of claim 8, wherein:
each of the first plurality of phases are different from each other,
each of the second plurality of phases are different from each other,
the plurality of reception antennas include a reference reception antenna and at least one additional reception antenna, and
the localization circuit is configured to measure a first reference phase of the first TPMS signal received at the reference reception antenna, measure a first respective shifted phase of the first TPMS signal received at each of the at least one additional reception antenna, determine a first respective phase shift between the first reference phase and each first respective shifted phase, and determine the location of the first TPMS sensor module based on each determined first respective phase shift corresponding to the first TPMS signal, and
the localization circuit is configured to measure a second reference phase of the second TPMS signal received at the reference reception antenna, measure a second respective shifted phase of the second TPMS signal received at each of the at least one additional reception antenna, determine a second respective phase shift between the second reference phase and each second respective shifted phase, and determine the location of the second TPMS sensor module based on each determined second respective phase shift corresponding to the second TPMS signal.

11. A tire pressure monitoring system (TPMS), comprising:
a plurality of axle assemblies each coupled to a different pair of wheels to which a different tire is mounted;
a plurality of TPMS sensor modules, wherein each of the plurality of TPMS sensor modules has a unique sensor identifier (ID), and each of the plurality of TPMS sensor modules is configured to measure an internal air pressure of a corresponding tire and transmit a corresponding TPMS signal that includes at least the unique sensor ID thereof; and
a localization module configured to localize each of the plurality of TPMS sensor modules based on receiving the corresponding TPMS signal of each of the plurality of TPMS sensor modules, wherein the localization module comprises:
a phase array antenna comprising a plurality of reception antennas each configured to receive each corresponding TPMS signal; and
a localization circuit configured to, for each corresponding TPMS signal, measure a phase of the corresponding TPMS signal at each of the plurality of reception antennas such that a corresponding plurality of phases for each corresponding TPMS signal is determined, and determine a location of a TPMS sensor module based on the corresponding plurality of phases associated with its corresponding TPMS signal.

12. The TPMS of claim 11, wherein, for each corresponding TPMS signal, the localization circuit is configured to determine a direction of the TPMS sensor module with respect to the phase array antenna based on the corresponding plurality of phases associated with its corresponding TPMS signal, and determine the location of the TPMS sensor module based on the determined direction.

13. The TPMS of claim 11, wherein:
the plurality of reception antennas include a reference reception antenna and at least two additional reception antennas, and
the localization circuit is configured to, for each corresponding TPMS signal, measure a reference phase of the corresponding TPMS signal received at the reference reception antenna, measure a respective shifted phase of the corresponding TPMS signal received at each of the at least two additional reception antennas with respect to the reference phase of the corresponding TPMS signal, generate a phase shift profile corresponding to the TPMS sensor module associated with the corresponding TPMS signal based on each respective phase shift, and determine the location of the TPMS sensor module associated with the corresponding TPMS signal based on the generated phase shift profile.

14. The TPMS of claim 13, wherein the localization circuit is configured to, for each corresponding TPMS signal, determine a direction of the TPMS sensor module associated with the corresponding TPMS signal with respect to the phase array antenna based on the phase shift profile, and determine the location of the TPMS sensor module associated with the corresponding TPMS signal based on the determined direction.

15. The TPMS of claim 11, wherein:
the plurality of axle assemblies have a first symmetry center that extends in a first direction that orthogonally bisects the plurality of axle assemblies and a second symmetry center that extends in a second direction parallel to a lengthwise extension of the plurality of axle assemblies, and
the plurality of reception antennas are arranged asymmetrically to the first symmetry center.

16. The TPMS of claim 15, wherein the plurality of reception antennas have a first symmetry center that extends in the first direction, the first symmetry center of the plurality of reception antennas being offset from the first symmetry center of the plurality of axle assemblies.

17. The TPMS of claim 16, wherein the plurality of reception antennas have a second symmetry center that extends in the second direction, wherein the plurality of axle assemblies are arranged on a same side of the second symmetry center of the plurality of reception antennas.

18. The TPMS of claim 11, wherein the plurality of reception antennas have a first symmetry center that extends in a first direction and a second symmetry center that extends in a second direction orthogonal to the first direction, and the first symmetry center and the second symmetry center are offset from any axis of symmetry extending in the first or the second direction that is defined by a pair of tires that includes the first tire.

19. The TPMS of claim 15, wherein the plurality of reception antennas are arranged in a line with a uniform distance between neighboring reception antennas of the plurality of reception antennas.

20. A method of localizing at least one tire pressure monitoring system (TPMS) sensor module, the method comprising:
transmitting, by a TPMS sensor module, a TPMS signal that includes at least a sensor identifier (ID) of the TPMS sensor module; and
localizing, by a localization module, the TPMS sensor module based on receiving the TPMS signal at a phase array antenna comprising a plurality of reception antennas each configured to receive the TPMS signal,
wherein localizing the TPMS sensor module comprises:
measuring a phase of the TPMS signal at each of the plurality of reception antennas such that a plurality of phases corresponding to the TPMS signal are determined; and
determining a location of the TPMS sensor module based on the plurality of phases.

21. The method of claim 20, wherein localizing the TPMS sensor module comprises:
determining a direction of the TPMS sensor module with respect to the phase array antenna based on the first plurality of phases; and
determining the location of the TPMS sensor module based on the determined direction.

22. The method of claim 20, wherein:
each of the plurality of phases are different,
the plurality of reception antennas include a reference reception antenna and at least one additional reception antenna, and
localizing the TPMS sensor module comprises:
measuring a reference phase of the TPMS signal received at the reference reception antenna,
measuring a respective shifted phase of the TPMS signal received at each of the at least one additional reception antenna, determining a respective phase shift between the reference phase and each respective shifted phase, and
determining the location of the TPMS sensor module based on each determined respective phase shift corresponding to the TPMS signal.

23. The method of claim 22, wherein:
the at least one additional reception antenna includes at least two additional reception antennas, and
localizing the TPMS sensor module comprises:
measuring the respective shifted phase of the TPMS signal received at each of the at least two additional reception antennas, generate a phase shift profile corresponding to the TPMS sensor module based on each measured respective phase shift, and determining the location of the TPMS sensor module based on the generated phase shift profile.

24. The method of claim 23, wherein localizing the TPMS sensor module comprises:
determining a direction of the TPMS sensor module with respect to the phase array antenna based on the phase shift profile; and
determining the location of the TPMS sensor module based on the determined direction.

* * * * *